UNITED STATES PATENT OFFICE.

CARL HEIDENREICH AND EDUARD MARTZ, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

GALLOCYANIN DYE.

No. 895,635.              Specification of Letters Patent.         Patented Aug. 11, 1908.

Application filed April 11, 1908. Serial No. 426,500.

To all whom it may concern:

Be it known that we, CARL HEIDENREICH and EDUARD MARTZ, doctors of philosophy, chemists, citizens of the German Empire, residing at Vohwinkel, near Elberfeld, Germany, Kingdom of Prussia, have invented new and useful Improvements in New Dyestuff of the Gallocyanin Series, of which the following is a specification.

Our invention relates to the production of a new coloring matter which is obtained by the action of para-nitroso-meta-chloro-diethylanilin upon gallamic acid. It is distinguished from coelestin blue by the greener shade it produces in dyeing or printing.

The following example will further illustrate our invention, the parts being by weight: 17 parts of gallamic acid and 37 parts of the chlorhydrate of nitroso-meta-chloro-diethylanilin are mixed together with 250 parts of alcohol and the resulting mixture is heated on the water-bath until the nitroso compound has disappeared. The dyestuff is filtered off and washed with water. It is a dark powder insoluble in water and soluble in dilute hydrochloric acid and concentrated sulfuric acid with a violet color.

To produce a suitable product for printing purposes, the coloring matter is converted by means of reducing agents e. g. zinc dust and hydrochloric acid into its yellowish-green leuco-compound which produces with chrome mordants pure greenish-blue shades.

Having now described our invention and in what manner the same is to be performed, we declare that what we claim, is:—

The herein-described new dyestuff obtainable by condensing para-nitroso-meta-chloro-diethylanilin with gallamic acid, which is after drying a dark powder insoluble in water and soluble in dilute hydrochloric acid and in concentrated sulfuric acid with a violet color; yielding upon reduction a yellowish-green leuco-compound which produces with chrome mordants pure greenish-blue shades, substantially as described.

In testimony whereof we have hereunto set our hands in the presence of two subscribing witnesses.

CARL HEIDENREICH. [L. S.]
   EDUARD MARTZ. [L. S.]

Witnesses:
 OTTO KÖNIG,
 WM. WASHINGTON BRUNSWICK.